United States Patent
Zhang et al.

(10) Patent No.: US 12,229,668 B2
(45) Date of Patent: Feb. 18, 2025

(54) OPERATION METHOD AND APPARATUS FOR NETWORK LAYER IN DEEP NEURAL NETWORK

(71) Applicant: HANGZHOU HIKVISION DIGITAL TECHNOLOGY CO., LTD., Hangzhou (CN)

(72) Inventors: Yuan Zhang, Hangzhou (CN); Di Xie, Hangzhou (CN); Shiliang Pu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 1016 days.

(21) Appl. No.: 17/254,002

(22) PCT Filed: Jun. 24, 2019

(86) PCT No.: PCT/CN2019/092553
§ 371 (c)(1),
(2) Date: Dec. 18, 2020

(87) PCT Pub. No.: WO2020/004101
PCT Pub. Date: Jan. 2, 2020

(65) Prior Publication Data
US 2021/0271973 A1 Sep. 2, 2021

(30) Foreign Application Priority Data
Jun. 27, 2018 (CN) .......................... 201810679580.X

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
CPC ................................... G06N 3/08; G06N 3/04
See application file for complete search history.

(56) References Cited

U.S. PATENT DOCUMENTS

2016/0328644 A1* 11/2016 Lin .......................... G06N 3/04
2016/0328645 A1* 11/2016 Lin .......................... G06N 3/08
(Continued)

FOREIGN PATENT DOCUMENTS

CN 106127297 11/2016
CN 106127297 A * 11/2016 ............... G06N 3/04
(Continued)

OTHER PUBLICATIONS

Wang, P., & Chang, J., (2016). Accelerating Convolutional Neural Networks for Mobile Applications (Year: 2016).*
(Continued)

*Primary Examiner* — Li B. Zhen
*Assistant Examiner* — Sadik A Alshahari
(74) *Attorney, Agent, or Firm* — NORTON ROSE FULBRIGHT US LLP

(57) ABSTRACT

An operation method and apparatus for a network layer in a Deep Neural Network are provided. The method includes: acquiring a weighted tensor of the network layer in the Deep Neural Network, the weighted tensor comprising a plurality of filters; converting each filter into a linear combination of a plurality of fixed-point convolution kernels by splitting the filter, wherein a weight value of each of the fixed-point convolution kernels is a fixed-point quantized value having a specified bit-width; for each filter, performing a convolution operation on input data of the network layer and each of the fixed-point convolution kernels, respectively, to obtain a plurality of convolution results, and calculating a weighted sum of the obtained convolution results based on the linear combination of the plurality of fixed-point convolution (Continued)

kernels of the filter to obtain an operation result of the filter; determining output data of the network layer.

15 Claims, 3 Drawing Sheets

(56) References Cited

U.S. PATENT DOCUMENTS

| | | | | |
|---|---|---|---|---|
| 2016/0328646 | A1* | 11/2016 | Lin | .......................... G06N 3/04 |
| 2017/0337471 | A1 | 11/2017 | Kadav et al. | |
| 2018/0314940 | A1* | 11/2018 | Kundu | ................... G06N 3/045 |
| 2020/0311531 | A1* | 10/2020 | Liu | ........................ G06N 3/044 |
| 2023/0121164 | A1* | 4/2023 | Liu | ........................ G06N 3/063 |
| | | | | 706/33 |

FOREIGN PATENT DOCUMENTS

| | | | | |
|---|---|---|---|---|
| CN | 106339753 | | 1/2017 | |
| CN | 107392309 | | 11/2017 | |
| CN | 107480770 | | 12/2017 | |
| CN | 107480770 B | * | 7/2020 | ........... G06N 3/0454 |
| WO | WO-2019086104 A1 | * | 5/2019 | ............... G06N 3/08 |

OTHER PUBLICATIONS

Wang, P., & Chang, J., (2017). Fixed-point Factorized Networks. (Year: 2017).*

Wang, P., & Chang, J., (Feb. 2018). Recent advances in efficient computation of deep convolutional neural networks. (Year: 2018).*

Astrid, M., & Lee, S, (May 2018). Deep compression of convolutional neural networks with low-rank approximation. (Year: 2018).*

Ambai, M., & Sato, I. (2014). SPADE: Scalar Product Accelerator by Integer Decomposition for Object Detection. (Year: 2014).*

Lin, D., (2016). Fixed Point Quantization of Deep Convolutional Networks. (Year: 2016).*

Jaderberg, M., (2014). Speeding up Convolutional Neural Networks with Low Rank Expansions. (Year: 2017).*

Gao, H., Tao, W., & Wen, D., (Jun. 2018). IFQ-Net: Integrated Fixed-point Quantization Networks for Embedded Vision. (Year: 2018).*

Gupta, S., Jun. 2015 (NPL: Deep Learning with Limited Numerical Precision). (Year: 2015).*

International Search Report and Written Opinion issued in Corresponding PCT Application No. PCT/CN2019/092553, dated Sep. 27, 2019 (English Translation provided).

Extended European Search Report issued in Corresponding Application No. 19827144.7, dated Apr. 11, 2022.

Jaderberg et al., "Speeding up Convolutional Neural Networks with Low Rank Expansions." www.arXiv.org, Proceedings Of The British Machine Vision Conference 2014, May 15, 2014, DOI: 10.5244/C.28.88, 1-12.

Kamiya et al., "Binary-decomposed DCNN for accelerating computation and compressing model without retraining" *IEEE International Conference on Computer Vision Workshops*, 2017, 1095-1102.

Wang et al., "Fixed-point Factorized Networks." www.arXiv.org, Cornell University Library, Online, Nov. 7, 2016, DOI: 10.1109/CVPR.2017.422.

* cited by examiner $$\boxed{w^1} = \alpha^1_1 \boxed{t^1_1} + \alpha^1_2 \boxed{t^1_2} + \cdots + \alpha^1_p \boxed{t^1_p}$$

$$\boxed{w^2} = \alpha^2_1 \boxed{t^2_1} + \alpha^2_2 \boxed{t^2_2} + \cdots + \alpha^2_p \boxed{t^2_p}$$

$$\vdots \qquad \vdots \qquad \vdots \qquad \vdots$$

$$\boxed{w^O} = \alpha^O_1 \boxed{t^O_1} + \alpha^O_2 \boxed{t^O_2} + \cdots + \alpha^O_p \boxed{t^O_p}$$

FIG. 2

$$\boxed{v^1} = \beta^1_1 \boxed{t^1_1} + \beta^1_2 \boxed{t^1_2} + \cdots + \beta^1_q \boxed{t^1_q}$$

$$\boxed{v^2} = \beta^2_1 \boxed{t^2_1} + \beta^2_2 \boxed{t^2_2} + \cdots + \beta^2_q \boxed{t^2_q}$$

$$\vdots \qquad \vdots \qquad \vdots \qquad \vdots$$

$$\boxed{v^M} = \beta^M_1 \boxed{t^M_1} + \beta^M_2 \boxed{t^M_2} + \cdots + \beta^M_q \boxed{t^M_q}$$

FIG. 3

OPERATION METHOD AND APPARATUS FOR NETWORK LAYER IN DEEP NEURAL NETWORK

CROSS REFERENCE TO RELATED APPLICATIONS

The present application is a national phase application under 35 U.S.C. § 371 of International Application No. PCT/CN2019/092553, filed Jun. 24, 2019, which claims the benefit of priority to Chinese Patent Application No. 201810679580.X, filed with the China National Intellectual Property Administration on Jun. 27, 2018 and entitled "Operation Method and Apparatus for Network Layer in Deep Neural Network", each of which are incorporated herein by reference in their entirety.

TECHNICAL FIELD

The present application relates to the technical field of machine learning, and in particular to an operation method and apparatus for a network layer in a Deep Neural Network.

BACKGROUND

As an emerging field in machine learning research, a Deep Neural Network (DNN) analyzes data by imitating the mechanism of the human brain, and is an intelligent model which performs analysis and learning by establishing and simulating the human brain. At present, for example, Convolutional Neural Network (CNN), Recurrent Neural Network (RNN), Long Short Term Memory (LSTM) and the like have been well applied in target detection and segmentation, behavior detection and recognition, voice recognition and other aspects.

Conventional DNN generally realizes the operation of basic units of the network by multiplication operation/addition operation of double-precision or single-precision floating-point number. Due to a relatively large amount of data involved in the operation, an amount of operation in each operation task for DNN is very large, and thus an operating efficiency for DNN is low.

SUMMARY

The objective of the embodiments of the present application is to provide an operation method and apparatus for a network layer in a Deep Neural Network to improve the operating efficiency of DNN. The specific technical solutions are as follows.

In a first aspect, an embodiment of the present application provides an operation method for a network layer in a Deep Neural Network. The method includes:
  acquiring a weighted tensor of the network layer in the Deep Neural Network, wherein the weighted tensor comprises a plurality of filters;
  for each of the filters of the network layer, converting the filter into a linear combination of a plurality of fixed-point convolution kernels by splitting the filter, wherein a weight value of each of the fixed-point convolution kernels is a fixed-point quantized value having a specified bit-width;
  for each of filters of the network layer, performing a convolution operation on input data of the network layer and each of the fixed-point convolution kernels of the filter, respectively, to obtain a plurality of convolution results, and calculating a weighted sum of the obtained convolution results based on the linear combination of the plurality of fixed-point convolution kernels of the filter to obtain an operation result of the filter; and determining output data of the network layer, which is composed of the obtained operation results of the filters.

Optionally, before for each of the filters of the network layer, converting the filter into the linear combination of the plurality of fixed-point convolution kernels by splitting the filter, the method further comprises:
  determining a preset quantized number of bits based on a preset application precision of the Deep Neural Network;
  for each of the filters of the network layer, converting the filter into the linear combination of the plurality of fixed-point convolution kernels by splitting the filter comprises:
  for each of the filters of the network layer, converting the filter into the linear combination of the plurality of fixed-point convolution kernels by splitting the filter based on the preset quantized number of bits; wherein, a sum of specified bit-widths corresponding to the fixed-point convolution kernels is equal to the preset quantized number of bits.

Optionally, the network layer comprises a convolution layer, and a size of the weighted tensor of the convolution layer is S×S×I×O;
  for each of the filters of the network layer, converting the filter into the linear combination of the plurality of fixed-point convolution kernels by splitting the filter comprises:
  for each of the filters of the convolution layer, converting the filter into the linear combination of the plurality of fixed-point convolution kernels by the splitting the filter based on a preset splitting formula; wherein, the preset splitting formula is:

$$\begin{cases} w^i = \sum_{j=1}^{p} \alpha_j t_j \\ B = \sum_{j=1}^{p} b_j \end{cases},$$

wherein, $w^i$ is an $i^{th}$ filter of the convolution layer, $i \in [1, O]$, p is the number of the fixed-point convolution kernels obtained by splitting the filter $w^i$, $\alpha_j$ is a preset linear weighting coefficient of a $j^{th}$ fixed-point convolution kernel, $t_j$ is the $j^{th}$ fixed-point convolution kernel and the size of $t_j$ is S×S×I, B is the preset quantized number of bits, and $b_j$ is a specified bit-width corresponding to the $j^{th}$ fixed-point convolution kernel.

Optionally, calculating the weighted sum of the obtained convolution results based on the linear combination of the plurality of fixed-point convolution kernels of the filter to obtain the operation result of the filter comprises:
  for each of the filters of the convolution layer, weighting the convolution results of the fixed-point convolution kernels based on the preset linear weighting coefficients of the fixed-point convolution kernels of the filter and calculating a sum of the weighted convolution results to obtain the operation result of the filter.

Optionally, the network layer comprises a fully connected layer, a size of the weighted tensor of the fully connected layer is M×N, and each of filters of the fully connected layer is a 1×N vector;

for each of the filters of the network layer, converting the filter into the linear combination of the plurality of fixed-point convolution kernels by splitting the filter comprises:

for each of the 1×N vectors of the fully connected layer, converting the vector into the linear combination of the plurality of fixed-point convolution kernels by splitting the vector based on a preset splitting formula; wherein, the preset splitting formula is:

$$\begin{cases} v^x = \sum_{y=1}^{q} \beta_y t_y \\ B = \sum_{y=1}^{q} b_y \end{cases}$$

wherein, $v^x$ is an $x^{th}$ 1×N vector of the fully connected layer, $x \in [1,M]$, q is the number of the fixed-point convolution kernels obtained by splitting the vector $v^x$, $\beta_y$ is a preset linear weighting coefficient of a $y^{th}$ fixed-point convolution kernel, $t_y$ is the $y^{th}$ fixed-point convolution kernel and the size of $t_y$ is 1×N, B is the preset quantized number of bits, and $b_y$ is a specified bit-width corresponding to the $y^{th}$ fixed-point convolution kernel.

Optionally, calculating the weighted sum of the obtained convolution results based on the linear combination of the plurality of fixed-point convolution kernels of the filter to obtain the operation result of the filter comprises:

for each of the 1×N vectors of the fully connected layer, weighting the convolution results of the fixed-point convolution kernels based on the preset linear weighting coefficients of the fixed-point convolution kernels of the vector and calculating a sum of the weighted convolution results to obtain the operation result of the vector.

In a second aspect, an embodiment of the present application provides an operation apparatus for a network layer in a Deep Neural Network; the apparatus includes:

an acquiring module configured for acquiring a weighted tensor of the network layer in the Deep Neural Network, wherein the weighted tensor comprises a plurality of filters;

a splitting module configured for: for each of the filters of the network layer, converting the filter into a linear combination of a plurality of fixed-point convolution kernels by splitting the filter, wherein a weight value of each of the fixed-point convolution kernels is a fixed-point quantized value having a specified bit-width;

an operation module configured for: for each of filters of the network layer, performing a convolution operation on input data of the network layer and each of the fixed-point convolution kernels of the filter, respectively, to obtain a plurality of convolution results, and calculating a weighted sum of the obtained convolution results based on the linear combination of the plurality of fixed-point convolution kernels of the filter to obtain an operation result of the filter; and a determination module configured for determining output data of the network layer, which is composed of the obtained operation results of the filters.

Optionally, the acquiring module is further configured for: determining a preset quantized number of bits based on a preset application precision of the Deep Neural Network;

the splitting module is further configured for:

for each of the filters of the network layer, converting the filter into the linear combination of the plurality of fixed-point convolution kernels by splitting the filter based on the preset quantized number of bits; wherein, a sum of specified bit-widths corresponding to the fixed-point convolution kernels is equal to the preset quantized number of bits.

Optionally, the network layer comprises a convolution layer, and a size of the weighted tensor of the convolution layer is S×S×I×O;

the splitting module is further configured for:

for each of the filters of the convolution layer, converting the filter into the linear combination of the plurality of fixed-point convolution kernels by the splitting the filter based on a preset splitting formula; wherein, the preset splitting formula is:

$$\begin{cases} w^i = \sum_{j=1}^{p} \alpha_j t_j \\ B = \sum_{j=1}^{p} b_j \end{cases},$$

wherein, $w^i$ is an $i^{th}$ filter of the convolution layer, $i \in [1, O]$, p is the number of the fixed-point convolution kernels obtained by splitting the filter $w^i$, $\alpha_j$ is a preset linear weighting coefficient of a $j^{th}$ fixed-point convolution kernel, $t_j$ is the $j^{th}$ fixed-point convolution kernel and the size of $t_j$ is S×S×I, B is the preset quantized number of bits, and $b_j$ is a specified bit-width corresponding to the $j^{th}$ fixed-point convolution kernel.

Optionally, the operation module is further configured for:

for each of the filters of the convolution layer, weighting the convolution results of the fixed-point convolution kernels based on the preset linear weighting coefficients of the fixed-point convolution kernels of the filter and calculating a sum of the weighted convolution results to obtain the operation result of the filter.

Optionally, the network layer comprises a fully connected layer, a size of the weighted tensor of the fully connected layer is M×N, and each of filters of the fully connected layer is a 1×N vector;

the splitting module is further configured for:

for each of the 1×N vectors of the fully connected layer, converting the vector into the linear combination of the plurality of fixed-point convolution kernels by splitting the vector based on a preset splitting formula; wherein, the preset splitting formula is:

$$\begin{cases} v^x = \sum_{y=1}^{q} \beta_y t_y \\ B = \sum_{y=1}^{q} b_y \end{cases}$$

wherein, $v^x$ is an $x^{th}$ 1×N vector of the fully connected layer, $x \in [1,M]$, q is the number of the fixed-point convolution kernels obtained by splitting the vector $v^x$, $\beta_y$ is a preset linear weighting coefficient of a $y^{th}$ fixed-point convolution kernel, $t_y$ is the $y^{th}$ fixed-point convolution kernel and the size of $t_y$ is 1×N, B is the preset quantized number of bits, and $b_y$ is a specified bit-width corresponding to the $y^{th}$ fixed-point convolution kernel.

Optionally, the operation module is further configured for:

for each of the 1×N vectors of the fully connected layer, weighting the convolution results of the fixed-point convolution kernels based on the preset linear weighting coefficients of the fixed-point convolution kernels of the vector and calculating a sum of the weighted convolution results to obtain the operation result of the vector.

In a third aspect, an embodiment of the present application provides an electronic device, including a processor and a machine-readable storage medium; the machine-readable storage medium stores machine-executable instructions, which are executed by the processor, so as to cause the processor to perform the method provided in the first aspect of the embodiments of the present application.

In a fourth aspect, an embodiment of the present application provides an machine-readable medium having stored thereon machine-executable instructions, wherein the machine-executable instructions are called and executed by the processor, so as to cause the processor to perform the method provided in the first aspect of the embodiments of the present application.

In a fifth aspect, an embodiment of the present application provides an application program, which, when executed, performs the method provided in the first aspect of the embodiments of the present application.

In summary, in the solutions provided by the embodiments of the present application, a weighted tensor of a network layer in a Deep Neural Network is acquired; for each of the filters in the weighted tensor of the network layer, the filter is split to be converted into a linear combination of a plurality of fixed-point convolution kernels; a convolution operation is performed on input data of the network layer and each of the fixed-point convolution kernels of the filter, respectively, to obtain a plurality of convolution results, and a weighted sum of the convolution results is calculated based on the linear combination of the plurality of fixed-point convolution kernels of the filter to obtain an operation result of the filter; and output data of the network layer, which is composed of the operation results of the filters, is determined. Since the weight value of each of the fixed-point convolution kernels is a fixed-point quantized value having the specified bit-width and the amount of operations for the fixed-point quantized value is smaller than the amount of operations for the floating point number, the amount of operations in each operation task for DNN can be reduced and thus the operating efficiency for DNN can be improved by performing a fixing-point quantization on a floating point number, and converting a filter including a floating-point weight value in the weighted tensor of the network layer into a linear combination of a plurality of fixed-point convolution kernels, each including a fixed-point quantized weight value.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings described below are for only some embodiments of the present application; those skilled in the art can also obtain other drawings based on these drawings without any creative efforts.

FIG. 2 is an exploded view of filters of a convolutional layer according to an embodiment of the present application.

FIG. 3 is an exploded view of vectors with a size of 1×N of fully connected layer according to an embodiment of the present application.

DETAILED DESCRIPTION

In order to make the objectives, technical solutions and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection of the present application.

In order to improve the operating efficiency of DNN, the embodiments of the present application provide an operation method and apparatus for a network layer in a Deep Neural Network, an electronic device, a machine-readable storage medium and an application program.

First, the operation method for a network layer in a Deep Neural Network provided by an embodiment of the present application is introduced below.

An executer of the operation method for a network layer in a Deep Neural Network according to an embodiment of the present application may be an electronic device that executes an intellectual algorithm. The electronic device may be an intellectual device performing target detection and segmentation, behavior detection and recognition or voice recognition, for example, a remote computer, a remote server, an intellectual camera, an intellectual audio device, and the like. The executer should at least include a processor carrying a core processing chip. The operation method for a network layer in a Deep Neural Network according to the embodiment of the present application may be implemented by at least one of a software, a hardware circuit and a logic circuit disposed in the executer.

Figure 1:
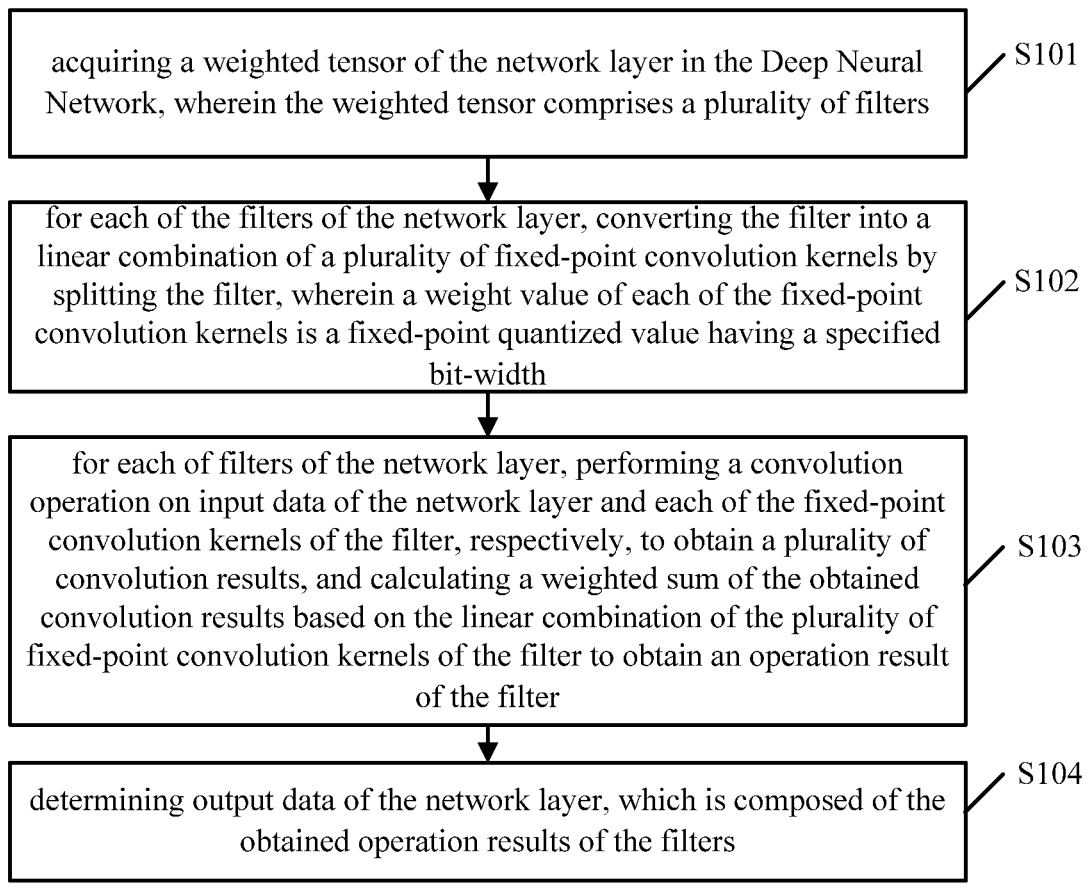
FIG. 1 is a flowchart of an operation method for a network layer in a Deep Neural Network according to an embodiment of the present application.

As shown in FIG. 1, an operation method for a network layer in a deep neural network according to the embodiment of the present application may include the following steps.

At S101, a weighted tensor of the network layer in the Deep Neural Network is acquired, wherein the weighted tensor includes a plurality of filters.

Network layers in the Deep Neural Network are configured for network operations, such as, convolution, dot product, and the like. The network layers may include Convolution layers (Cony layer) and fully connected layers, and each of the network layers includes the weighted tensor for performing a network operation. DNN is a broad data processing method and may be any one of data processing methods, such as, CNN, RNN and LSTM.

A weighted tensor includes specific weight values in a Cony layer or specific weight values in a fully connected layer. A weighted tensor of the $k^{th}$ Cony layer is denoted by W, and its size is S×S×I×O. w=W(:,:,:,i) is the $i^{th}$ filter of the Cony layer, and the size of the $i^{th}$ filter is S×S×I. The weighted tensor of the Cony layer may be divided into O filters based on the number of output feature vectors. For fully connected layers, a weighted tensor of the $1^{st}$ fully connected layer is denoted by V, and its size is M×N. The number of output feature vectors of the fully connected layer is M, and the size of the $j^{th}$ filter of the fully connected filter is 1×N. The weighted tensor of the fully connected layer may be divided into M filters based on the number of output feature vectors.

At S102, for each of the filters of the network layer, the filter is split to be converted a linear combination of a plurality of fixed-point convolution kernels; wherein, a weight value of each of the fixed-point convolution kernels is a fixed-point quantized value having a specified bit-width.

The weight values of the weighted tensor in the network layer are usually floating-point numbers. A floating-point number may be represented as a product of one fixed-point quantized value and a weight or as a weighted sum of a plurality of fixed-point quantized values and corresponding weights. The weights can be obtained through multiple times of training and represent scale coefficients. Approximate floating-point numbers can be obtained by multiplying the weights with the fixed-point quantized values.

In practice, the number of bits that are required to represent a weight value of a neural network model in different application scenarios is different. For some harder tasks, such as, face recognition, a weight value is represented by 16 bits. For some easier tasks, such as, target detection, a weight value is represented by 4 bits. In this case, an operation rate cannot be significantly reduced due to a larger bit-width (i.e., the number of bits), and the requirement for supporting multiple numbers of bits in the same hardware platform will increase the complexity for designing a circuit and reduce the regularity of the circuit. Therefore, the weighted tensor can be converted uniformly to low-bit fixed-point convolution kernels through a method for splitting weight values, which largely reduces the amount of operation and the regularity for designing the circuit. For example, when a certain filter needs to be represented by a bit-width of 8 bits, the filter may be designed as a linear combination of four 2-bit fixed-point convolution kernels and it is only needed to perform operation on a 2-bit fixed-point convolution kernel each time. When a certain filter needs to be represented by a bit-width of 4 bits, the filter may be designed as a linear combination of two 2-bit fixed-point convolution kernels and it is only needed to perform operation on a 2-bit fixed-point convolution kernel each time. The scheme significantly reduces the amount of operation and improves the regularity for designing the circuit. The weights of the linear combination here represent scale coefficients that can be obtained by training.

Optionally, before S102, the method provided by the embodiment of the present application may further include: determining a preset quantized number of bits based on a preset application precision of the Deep Neural Network.

S102 may further include: for each of the filters of the network layer, converting the filter into the linear combination of the plurality of fixed-point convolution kernels by splitting the filter based on the preset quantized number of bits; wherein, a sum of specified bit-widths corresponding to all of the fixed-point convolution kernels is equal to the preset quantized number of bits.

As described above, the preset application precision of the Deep Neural Network determines the preset quantized number of bits of each of the quantized weight values in the weighted tensor. The bigger the preset application precision is, the bigger the preset quantized number of bits is. For ensuring the accuracy of splitting each of the filters, the sum of the specified bit-widths corresponding to all of the fixed-point convolution kernels that are obtained by the splitting is equal to the preset quantized number of bits.

Optionally, the network layer may include a Cony layer, and the size of the weighted tensor of the Cony layer may be S×S×I×O.

S102 may further include: for each of the filters of the Cony layer, converting the filter into the linear combination of the plurality of fixed-point convolution kernels by splitting the filter based on a preset splitting formula. The preset splitting formula is $$\begin{cases} w^i = \sum_{j=1}^{p} \alpha_j t_j \\ B = \sum_{j=1}^{p} b_j \end{cases} \quad (1)$$

where $w^i$ is the $i^{th}$ filter of the Cony layer, $i \in [1,O]$, p is the number of the fixed-point convolution kernels obtained by splitting the filter $w^i$, $\alpha_j$ is a preset linear weighting coefficient of the $j^{th}$ fixed-point convolution kernel, $t_j$ is the $j^{th}$ fixed-point convolution kernel, the size of $t_j$ is S×S×I, B is the preset quantized number of bits, and $b_j$ is a specified bit-width corresponding to the $j^{th}$ fixed-point convolution kernel.

For a Cony layer in the network, the filter $w^i$ with a size of S×S×I in the Cony layer is split to be converted into a linear combination of p low-bit fixed-point convolution kernels, and the number of low-bit fixed-point bits (i.e. the specified bit-width) of the $j^{th}$ fixed-point convolution kernel is denoted by $b_j$. After splitting each of the filters in the weighted tensor of the Cony layer via the formula (1), the weighted tensor of each Cony layer in the network model can be represented as shown in FIG. 2, i.e., a floating-point filter of the model is split to be converted into a linear combination of a plurality of low-bit fixed-point convolution kernels, which substantially is a linear combination of low-bit fixed-point weight values in the plurality of the low-bit fixed-point convolution kernels.

Optionally, the network layer may include a fully connected layer. The size of the weighted tensor of the fully connected layer may be M×N and each of filters of the fully connected layer is a 1×N vector.

S102 may further include: for each of the 1×N vectors of the fully connected layer, converting the vector into the linear combination of the plurality of fixed-point convolution kernels by splitting the vector based on a preset splitting formula. The preset splitting formula is:

$$\begin{cases} v^x = \sum_{y=1}^{q} \beta_y t_y \\ B = \sum_{y=1}^{q} b_y \end{cases} \quad (2)$$

where $v^x$ is the $x^{th}$ 1×N vector of the fully connected layer, $x \in [1,M]$, q is the number of the fixed-point convolution kernels obtained by splitting the vector $v^x$, $\beta_y$ is a preset linear weighting coefficient of the $y^{th}$ fixed-point convolution kernel, $t_y$ is the $y^{th}$ fixed-point convolution kernel and the size of $t_y$ is 1×N, B is a preset quantized number of bits, and $b_y$ is a specified bit-width corresponding to the $y^{th}$ fixed-point convolution kernel.

For a fully connected layer in the network, each of the 1×N vectors of the fully connected layer can be understood as a filter of the fully connected layer. Each of the 1×N vectors of the fully connected layer is split to be converted into a linear combination of q low-bit fixed-point convolution kernels, and the number of low-bit fixed-point bits (i.e. the specified bit-width) of the $y^{th}$ fixed-point convolution kernel is denoted by $b_j$. After splitting each of the vectors in the weighted tensor of the fully connected layer via the formula (2), the weighted tensor of each of fully connected layers in the network model can be represented as shown in FIG. 3, i.e., a floating-point vector of the model is split to be converted into a linear combination of a plurality of low-bit fixed-point convolution kernels, which substantially is a linear combination of low-bit fixed-point weight values in the plurality of the low-bit fixed-point convolution kernels.

At S103, for each of the filters of the network layer, a convolution operation is performed on input data of the network layer and each of the fixed-point convolution kernels of the filter, respectively, to obtain a plurality of convolution results, and a weighted sum of the convolution results is calculated based on the linear combination of the plurality of fixed-point convolution kernels of the filter to obtain an operation result of the filter.

Figure 4:
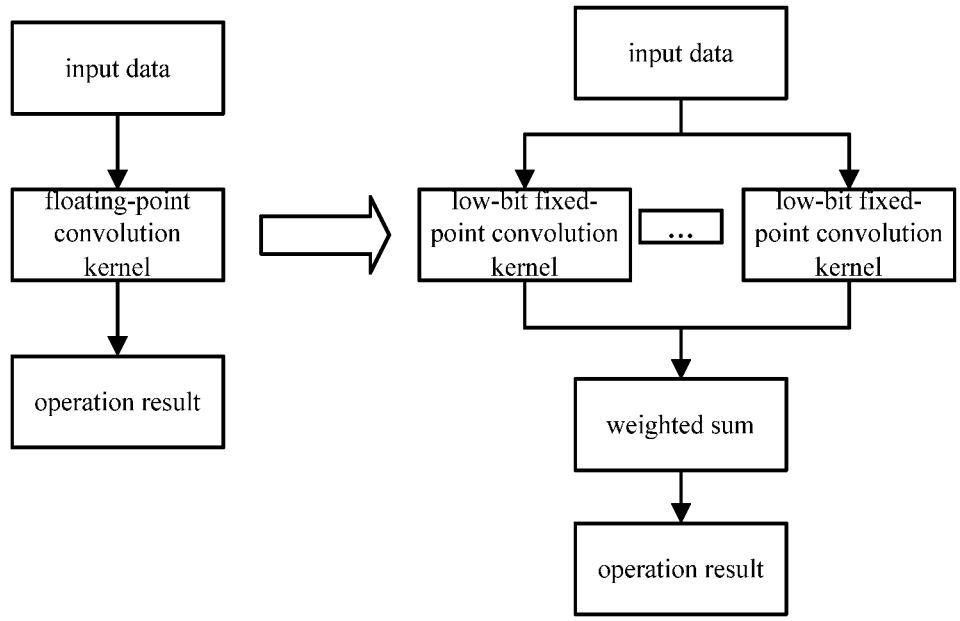
FIG. 4 is a diagram for comparing an existing operation for a network layer with an operation for a network layer according to an embodiment of the present application.

The fixed-pointing of the weighted tensor of the network layer by S102 can convert one operation on a floating-point weight value of a Cony layer or a floating-point weight value of a fully connected layer into operations on a plurality of low-bit fixed-point weight values of the Cony layer or a plurality of low-bit fixed-point weight values of the fully connected layer. As shown in FIG. 4, in performing an operation on a network model, the model structure as shown in the left of the FIG. 4 can be converted into the model structure as shown in the right of the FIG. 4 to perform the operation. This reduces computing granularity of a hardware platform and improves the utilization rate of resources of the hardware platform while significantly reducing the number of parameters of the model and the amount of operation of the model.

The convolution operation on the input data and each of the fixed-point convolution kernels is a process of performing dot product and summation operations, which is not described here. After the convolution results of all of the fixed-point convolution kernels are obtained, the weighted sum of the convolution results can be calculated based on the linear combination manner of the plurality of fixed-point convolution kernels of the filter, e.g., the weighted sum manner, to obtain an operation result of the filter.

Optionally, if the network layer is a Cony layer, S103 may further include: for each of the filters of the Cony layer, weighting the convolution results of the fixed-point convolution kernels based on a preset linear weighting coefficient of each of the fixed-point convolution kernels of the filter and calculating a sum of the weighted convolution results to obtain the operation result of the filter.

If the network layer is a fully connected layer, S103 may further include: for each of the 1×N vectors of the fully connected layer, weighting the convolution results of the fixed-point convolution kernels based on a preset linear weighting coefficient of each of the fixed-point convolution kernels of the vector and calculating a sum of the weighted convolution results to obtain the operation result of the vector.

In S102, a process of splitting a filter has been introduced respectively for the Cony layer or the fully connected layer as the network layer. In the process of the splitting, the filter is represented as a linear combination of the sum of the products of the fixed-point convolution kernels and the preset linear weighting coefficients. Therefore, in performing the convolution operation, the convolution operation is performed on the input data and each of the fixed-point convolution kernels, respectively, and the weighted sum of the convolution results is calculated based on the preset linear weighting coefficients to obtain the operation result of the filter.

At S104, output data of the network layer, which is composed of the operation results of all of the filters, is determined.

The filters of the network layer correspond to the number of output feature vectors of the network layer. Therefore, the output data of the network layer is actually a combination of operation results of all of the filters. For example, if a network layer includes 5 filters, the output data of the network layer actually includes 5 feature vectors.

In the embodiment, a weighted tensor of a network layer in a Deep Neural Network is acquired; for each of the filters in the weighted tensor of the network layer, the filter is split to be converted into a linear combination of a plurality of fixed-point convolution kernels; a convolution operation is performed on input data of the network layer and each of the fixed-point convolution kernels of the filter, respectively, to obtain a plurality of convolution results; a weighted sum of the convolution results is calculated based on the linear combination of the plurality of fixed-point convolution kernels of the filter to obtain an operation result of the filter; and the output data of the network layer, which is composed of the operation results of the filters, is determined. Since the weight value of each of the fixed-point convolution kernels is a fixed-point quantized value having the specified bit-width and the amount of operations for the fixed-point quantized value is smaller than the amount of operations for the floating point number, the amount of operations in each operation task for DNN can be reduced and thus the operating efficiency for DNN can be improved by performing a fixing-point quantization on a floating point number, and converting a filter including a floating-point weight value in the weighted tensor of the network layer into a linear combination of a plurality of fixed-point convolution kernels, each including a fixed-point quantized weight value.

Figure 5:
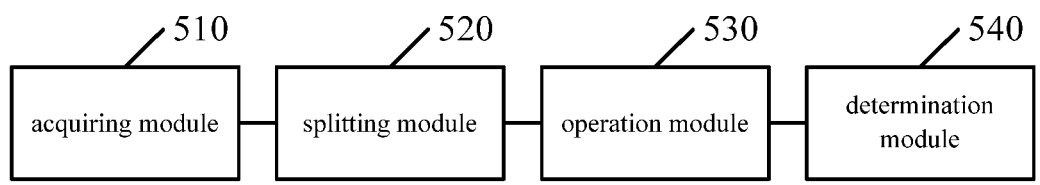
FIG. 5 is a structural diagram of an operation apparatus for a network layer in the Deep Neural Network according to an embodiment of the present application.

Corresponding to the embodiment of the method, an embodiment of the present application provides an operation apparatus for a network layer in a Deep Neural Network. As shown in FIG. 5, the operation apparatus for a network layer in the Deep Neural Network may include:

an acquiring module 510 configured for acquiring a weighted tensor of the network layer in the Deep Neural Network, wherein the weighted tensor comprises a plurality of filters;

a splitting module 520 configured for: for each of the filters of the network layer, converting the filter into a linear combination of a plurality of fixed-point convolution kernels by splitting the filter, wherein a weight value of each of the fixed-point convolution kernels is a fixed-point quantized value having a specified bit-width;

an operation module 530 configured for: for each of filters of the network layer, performing a convolution operation on input data of the network layer and each of the fixed-point convolution kernels of the filter, respectively, to obtain a plurality of convolution results, and calculating a weighted sum of the obtained convolution results based on the linear combination of the plurality of fixed-point convolution kernels of the filter to obtain an operation result of the filter; and a determination module 540 configured for determining output data of the network layer, which is composed of the obtained operation results of the filters.

Optionally, the acquiring module 510 may be further configured for: determining a preset quantized number of bits based on a preset application precision of the Deep Neural Network.

The splitting module 520 may be further configured for:
for each of the filters of the network layer, converting the filter into the linear combination of the plurality of fixed-point convolution kernels by splitting the filter based on the preset quantized number of bits; wherein, a sum of specified bit-widths corresponding to the fixed-point convolution kernels is equal to the preset quantized number of bits.

Optionally, the network layer may include a convolution layer, and a size of the weighted tensor of the convolution layer may be S×S×I×O;
the splitting module 520 may be further configured for:
for each of the filters of the convolution layer, converting the filter into the linear combination of the plurality of fixed-point convolution kernels by the splitting the filter based on a preset splitting formula; wherein, the preset splitting formula is:

$$\begin{cases} w^i = \sum_{j=1}^{p} \alpha_j t_j \\ B = \sum_{j=1}^{p} b_j \end{cases},$$

wherein, $w^i$ is an $i^{th}$ filter of the convolution layer, $i \in [1, O]$, p is the number of the fixed-point convolution kernels obtained by splitting the filter $w^i$, $\alpha_j$ is a preset linear weighting coefficient of a $j^{th}$ fixed-point convolution kernel, $t_j$ is the $j^{th}$ fixed-point convolution kernel and the size of $t_j$ is S×S×I, B is the preset quantized number of bits, and $b_j$ is a specified bit-width corresponding to the $j^{th}$ fixed-point convolution kernel.

Optionally, the operation module 530 may be further configured for:
for each of the filters of the convolution layer, weighting the convolution results of the fixed-point convolution kernels based on the preset linear weighting coefficients of the fixed-point convolution kernels of the filter and calculating a sum of weighted convolution results to obtain the operation result of the filter.

Optionally, the network layer may include a fully connected layer. The size of the weighted tensor of the fully connected layer may be M×N and each of the filters of the fully connected layer may be a 1×N vector.

The splitting module 520 may be further configured for:
for each of the 1×N vectors of the fully connected layer, converting the vector into the linear combination of the plurality of fixed-point convolution kernels by splitting the vector based on a preset splitting formula; wherein, the preset splitting formula is:

$$\begin{cases} v^x = \sum_{y=1}^{q} \beta_y t_y \\ B = \sum_{y=1}^{q} b_y \end{cases}$$

wherein, $v^x$ is an $x^{th}$ 1×N vector of the fully connected layer, $x \in [1,M]$, q is the number of the fixed-point convolution kernels obtained by splitting the vector $v^x$, $\beta_y$ is a preset linear weighting coefficient of a $y^{th}$ fixed-point convolution kernel, $t_y$ is the $y^{th}$ fixed-point convolution kernel and the size of $t_y$ is 1×N, B is the preset quantized number of bits, and $b_y$ is a specified bit-width corresponding to the $y^{th}$ fixed-point convolution kernel.

Optionally, the operation module 530 may be further configured for:
for each of the 1×N vectors of the fully connected layer, weighting the convolution results of the fixed-point convolution kernels based on the preset linear weighting coefficients of the fixed-point convolution kernels of the vector and calculating a sum of the weighted convolution results to obtain the operation result of the vector.

In the embodiment, a weighted tensor of a network layer in a Deep Neural Network is acquired; for each of the filters in the weighted tensor of the network layer, the filter is split to be converted into a linear combination of a plurality of fixed-point convolution kernels; a convolution operation is performed on input data of the network layer and each of the fixed-point convolution kernels of the filter, respectively, to obtain a plurality of convolution results; a weighted sum of the convolution results is calculated based on the linear combination of the plurality of fixed-point convolution kernels of the filter to obtain an operation result of the filter; and the output data of the network layer, which is composed of the operation results of the filters, is determined. Since the weight value of each of the fixed-point convolution kernels is a fixed-point quantized value having the specified bit-width and the amount of operations for the fixed-point quantized value is smaller than the amount of operations for the floating point number, the amount of operations in each operation task for DNN can be reduced and thus the operating efficiency for DNN can be improved by performing a fixing-point quantization on a floating point number, and converting a filter including a floating-point weight value in the weighted tensor of the network layer into a linear combination of a plurality of fixed-point convolution kernels, each including a fixed-point quantized weight value.

Figure 6:
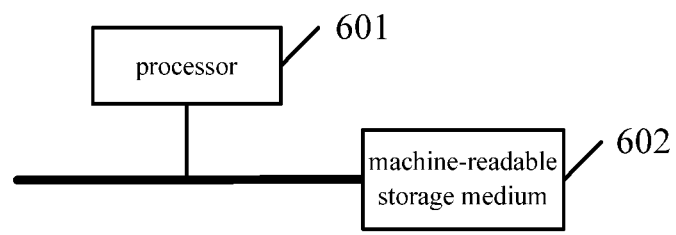
FIG. 6 is a structural diagram of an electronic device according to an embodiment of the present application.

For improving the operating efficiency for DNN, an embodiment of the present application further provides an electronic device. As shown in FIG. 6, the electronic device includes a processor 601 and a machine-readable storage medium 602.

The machine-readable storage medium 602 stores machine-executable instructions that are executable by the processor 601.

The processor 601 is caused by the machine-executable instructions stored in the machine-readable storage medium 602 to perform the operation method for a network layer in a Deep Neural Network provided by the embodiment of the present application.

Data transmission may be implemented between the machine-readable storage medium 602 and the processor 601 in a wired connection or wireless connection manner. The electronic device can communicate with other devices via wired communication interfaces or wireless communication interfaces.

The machine-readable storage medium may include a Random Access Memory (RAM), or a Non-volatile Memory (NVM), for example, at least one magnetic disk memory. Optionally, the machine-readable storage medium may also be at least one storage apparatus located away from the processor.

The processor may be a general-purpose processor, including a Central Processing Unit (CPU), a Network Processor (NP), etc.; it may also be a Digital Signal Processor (DSP), an Application Specific Integrated Circuit (ASIC), a Field-Programmable Gate Array (FPGA) or other programmable logic devices, discrete gates or transistor logic devices, discrete hardware components.

In this embodiment, the processor of the electronic device, by reading the machine-executable instructions stored in the machine-readable medium and executing the machine-executable instructions, can acquire a weighted tensor of a network layer in a Deep Neural Network; for each of the filters in the weighted tensor of the network layer, convert the filter into a linear combination of a plurality of fixed-point convolution kernels by splitting the filter; perform a convolution operation on input data of the network layer and each of the fixed-point convolution kernels of the filter, respectively, to obtain a plurality of convolution results, and calculate a weighted sum of the convolution results based on the linear combination of the plurality of fixed-point convolution kernels of the filter to obtain an operation result of the filter; and determine output data of the network layer, which is composed of the operation results of the filters. Since the weight value of each of the fixed-point convolution kernels is a fixed-point quantized value having the specified bit-width and the amount of operations for the fixed-point quantized value is smaller than the amount of operations for the floating point number, the amount of operations in each operation task for DNN can be reduced and thus the operating efficiency for DNN can be improved by performing a fixing-point quantization on a floating point number, and converting a filter including a floating-point weight value in the weighted tensor of the network layer into a linear combination of a plurality of fixed-point convolution kernels, each including a fixed-point quantized weight value.

Further, corresponding to the operation method for a network layer in a Deep Neural Network according to the embodiment, an embodiment of the present application provides a machine-readable storage medium having stored thereon machine-executable instructions. The machine-executable instructions cause a processor to perform the operation method for a network layer in a Deep Neural Network provided by the embodiment of the present application.

In this embodiment, the machine-readable storage medium stores the machine-executable instructions. The instructions, when executed, perform the operation method for a network layer in a Deep Neural Network provided by the embodiment of the present application, including: acquiring a weighted tensor of a network layer in a Deep Neural Network; for each of the filters in the weighted tensor of the network layer, converting the filter into a linear combination of a plurality of fixed-point convolution kernels by splitting the filter; performing a convolution operation on input data of the network layer and each of the fixed-point convolution kernels of the filter, respectively, to obtain a plurality of convolution results, and calculating a weighted sum of the convolution results based on the linear combination of the plurality of fixed-point convolution kernels of the filter to obtain an operation result of the filter; determining output data of the network layer, which is composed of the operation results of the filters. Since the weight value of each of the fixed-point convolution kernels is a fixed-point quantized value having the specified bit-width and the amount of operations for the fixed-point quantized value is smaller than the amount of operations for the floating point number, the amount of operations in each operation task for DNN can be reduced and thus the operating efficiency for DNN can be improved by performing a fixing-point quantization on a floating point number, and converting a filter including a floating-point weight value in the weighted tensor of the network layer into a linear combination of a plurality of fixed-point convolution kernels, each including a fixed-point quantized weight value.

Further, an embodiment of the present application further provides an application program. The application program, when executed, performs the method for a network layer in a Deep Neural Network provided by the embodiment of the present application.

In the embodiment of the present application, the application program, when executed, performs the operation method for a network layer in a Deep Neural Network provided by the embodiment of the present application, including: acquiring a weighted tensor of a network layer in a Deep Neural Network; for each of the filters in the weighted tensor of the network layer, converting the filter into a linear combination of a plurality of fixed-point convolution kernels by splitting the filter; performing a convolution operation on input data of the network layer and each of the fixed-point convolution kernels of the filter, respectively, to obtain a plurality of convolution results, and calculating a weighted sum of the convolution results based on the linear combination of the plurality of fixed-point convolution kernels of the filter to obtain an operation result of the filter; determining output data of the network layer, which is composed of the operation results of the filters. Since the weight value of each of the fixed-point convolution kernels is a fixed-point quantized value having the specified bit-width and the amount of operations for the fixed-point quantized value is smaller than the amount of operations for the floating point number, the amount of operations in each operation task for DNN can be reduced and thus the operating efficiency for DNN can be improved by performing a fixing-point quantization on a floating point number, and converting a filter including a floating-point weight value in the weighted tensor of the network layer into a linear combination of a plurality of fixed-point convolution kernels, each including a fixed-point quantized weight value.

The embodiments of the electronic device, the machine-readable medium and the application program are described briefly, since they are substantially similar to the embodiment of the method. Related contents can refer to the part that describes the embodiment of the method.

It should be noted that the relationship terms used herein, such as "first", "second" and the like are only to distinguish one entity or operation from another entity or operation, but do not necessarily require or imply that there is an actual relationship or order between these entities or operations. Moreover, the terms "include", "comprise", or any other variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the apparatus, the electronic device, the machine-readable medium and the application program are described briefly, since they are substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. An operation method for a network layer in a Deep Neural Network, wherein the method is applied to target detection and segmentation, behavior detection and recognition or voice recognition and performed by an electronic device, wherein the electronic device includes a processor and a machine-readable storage medium, the processor of the electronic device, by reading machine-executable instructions stored in the machine-readable medium and executing the machine-executable instructions, implements the following operations comprising:
    acquiring a weighted tensor of the network layer in the Deep Neural Network, wherein the weighted tensor comprises a plurality of filters;
    for each of the filters of the network layer, converting the filter into a linear combination of a plurality of fixed-point convolution kernels by splitting the filter, wherein a weight value of each of the fixed-point convolution kernels is a fixed-point quantized value having a specified bit-width;
    for each of filters of the network layer, performing a convolution operation on input data of the network layer and each of the fixed-point convolution kernels of the filter, respectively, to obtain a plurality of convolution results, and calculating a weighted sum of the obtained convolution results based on the linear combination of the plurality of fixed-point convolution kernels of the filter to obtain an operation result of the filter; and
    determining output data of the network layer, which is composed of the obtained operation results of the filters;
    wherein, the network layer comprises a convolution layer, and the size of the weighted tensor of the convolution layer is S×S×I×O, wherein O represents the number of filters included in the weighted tensor of the convolutional layer;
    for each of the filters of the network layer, converting the filter into the linear combination of the plurality of fixed-point convolution kernels by splitting the filter comprises:
    for each filter of the convolution layer, converting the filter into the linear combination of the plurality of fixed-point convolution kernels by the splitting the filter based on a preset splitting formula; wherein, the preset splitting formula is:

$$\begin{cases} w^i = \sum_{j=1}^{p} \alpha_j t_j \\ B = \sum_{j=1}^{p} b_j \end{cases},$$

wherein, $w^i$ is an $i^{th}$ filter of the convolution layer, $i \in [1, O]$, p is the number of the fixed-point convolution kernels obtained by splitting the filter $w^i$, $\alpha_j$ is a preset linear weighting coefficient of a $j^{th}$ fixed-point convolution kernel, $t_j$ is the $j^{th}$ fixed-point convolution kernel and the size of $t_j$ is S×S×I, B is the preset quantized number of bits, and $b_j$ is a specified bit-width corresponding to the $j^{th}$ fixed-point convolution kernel.

2. The method of claim 1, wherein, before the converting the filter into the linear combination of the plurality of fixed-point convolution kernels by splitting the filter, the method further comprises:
    determining a preset quantized number of bits based on a preset application precision of the Deep Neural Network;
    for each of the filters of the network layer, converting the filter into the linear combination of the plurality of fixed-point convolution kernels by splitting the filter comprises:
    for each of the filters of the network layer, converting the filter into the linear combination of the plurality of fixed-point convolution kernels by splitting the filter based on the preset quantized number of bits; wherein, the sum of the specified bit-widths corresponding to the fixed-point convolution kernels is equal to the preset quantized number of bits.

3. The method of claim 2, wherein, the network layer comprises a fully connected layer, the size of the weighted tensor of the fully connected layer is M×N, and each filter of the fully connected layer is a 1×N vector, wherein M represents the number of filters included in the weighted tensor of the fully connected layer;
    for each of the filters of the network layer, converting the filter into the linear combination of the plurality of fixed-point convolution kernels by splitting the filter comprises:
    for each 1×N vector of the fully connected layer, converting the vector into the linear combination of the plurality of fixed-point convolution kernels by splitting the vector based on a preset splitting formula; wherein, the preset splitting formula is:

$$\begin{cases} v^x = \sum_{y=1}^{q} \beta_y t_y \\ B = \sum_{y=1}^{q} b_y \end{cases}$$

wherein, $v^x$ is an $x^{th}$ 1×N vector of the fully connected layer, $x \in [1, M]$, q is the number of the fixed-point convolution kernels obtained by splitting the vector $v^x$, $\beta_y$ is a preset linear weighting coefficient of a $y^{th}$ fixed-point convolution kernel, $t_y$ is the $y^{th}$ fixed-point convolution kernel and the size of $t_y$ is 1×N, B is the preset quantized number of bits, and $b_y$ is a specified bit-width corresponding to the $y^{th}$ fixed-point convolution kernel.

4. The method of claim 3, wherein, calculating the weighted sum of the obtained convolution results based on the linear combination of the plurality of fixed-point convolution kernels of the filter to obtain the operation result of the filter comprises:
    for each of the 1×N vectors of the fully connected layer, weighting the convolution results of the fixed-point convolution kernels based on the preset linear weighting coefficients of the fixed-point convolution kernels of the vector and calculating a sum of the weighted convolution results to obtain the operation result of the vector.

5. The method of claim 1, wherein, calculating the weighted sum of the obtained convolution results based on the linear combination of the plurality of fixed-point convolution kernels of the filter to obtain the operation result of the filter comprises:
   for each filter of the convolution layer, weighting the convolution results of the fixed-point convolution kernels based on the preset linear weighting coefficients of the fixed-point convolution kernels of the filter and calculating a sum of the weighted convolution results to obtain the operation result of the filter.

6. The method of claim 1, wherein, the network layer comprises a fully connected layer, the size of the weighted tensor of the fully connected layer is M×N, and each filter of the fully connected layer is a 1×N vector, wherein M represents the number of filters included in the weighted tensor of the fully connected layer;
   for each of the filters of the network layer, converting the filter into the linear combination of the plurality of fixed-point convolution kernels by splitting the filter comprises:
   for each 1×N vector of the fully connected layer, converting the vector into the linear combination of the plurality of fixed-point convolution kernels by splitting the vector based on a preset splitting formula; wherein, the preset splitting formula is:

$$\begin{cases} v^x = \sum_{y=1}^{q} \beta_y t_y \\ B = \sum_{y=1}^{q} b_y \end{cases}$$

wherein, $v^x$ is an $x^{th}$ 1×N vector of the fully connected layer, $x \in [1,M]$, q is the number of the fixed-point convolution kernels obtained by splitting the vector $v^x$, $\beta_y$ is a preset linear weighting coefficient of a $y^{th}$ fixed-point convolution kernel, $t_y$ is the $y^{th}$ fixed-point convolution kernel and the size of $t_y$ is 1×N, B is the preset quantized number of bits, and $b_y$ is a specified bit-width corresponding to the $y^{th}$ fixed-point convolution kernel.

7. The method of claim 6, wherein, calculating the weighted sum of the obtained convolution results based on the linear combination of the plurality of fixed-point convolution kernels of the filter to obtain the operation result of the filter comprises:
   for each of the 1×N vectors of the fully connected layer, weighting the convolution results of the fixed-point convolution kernels based on the preset linear weighting coefficients of the fixed-point convolution kernels of the vector and calculating a sum of the weighted convolution results to obtain the operation result of the vector.

8. A non-transitory machine-readable storage medium having stored thereon machine-executable instructions; wherein, the machine-executable instructions are called and executed by the processor, so as to cause the processor to perform the method of claim 1.

9. An electronic device, comprising a processor and a machine-readable storage medium; wherein the electronic device executes an intellectual algorithm, and the electronic device is configured to perform target detection and segmentation, behavior detection and recognition or voice recognition, wherein, the machine-readable storage medium stores machine-executable instructions, which are executed by the processor, so as to cause the processor to perform the following operations: acquiring a weighted tensor of the network layer in the Deep Neural Network, wherein the weighted tensor comprises a plurality of filters;
   for each of the filters of the network layer, converting the filter into a linear combination of a plurality of fixed-point convolution kernels by splitting the filter, wherein a weight value of each of the fixed-point convolution kernels is a fixed-point quantized value having a specified bit-width;
   for each of filters of the network layer, performing a convolution operation on input data of the network layer and each of the fixed-point convolution kernels of the filter, respectively, to obtain a plurality of convolution results, and calculating a weighted sum of the obtained convolution results based on the linear combination of the plurality of fixed-point convolution kernels of the filter to obtain an operation result of the filter; and
   determining output data of the network layer, which is composed of the obtained operation results of the filters;
   wherein, the network layer comprises a convolution layer, and the size of the weighted tensor of the convolution layer is S×S×I×O, wherein O represents the number of filters included in the weighted tensor of the convolutional layer;
   for each of the filters of the network layer, converting the filter into the linear combination of the plurality of fixed-point convolution kernels by splitting the filter comprises:
   for each filter of the convolution layer, converting the filter into the linear combination of the plurality of fixed-point convolution kernels by the splitting the filter based on a preset splitting formula; wherein, the preset splitting formula is:

$$\begin{cases} w^i = \sum_{j=1}^{p} \alpha_j t_j \\ B = \sum_{j=1}^{p} b_j \end{cases},$$

wherein, $w^i$ is an $i^{th}$ filter of the convolution layer, $i \in [1, O]$, p is the number of the fixed-point convolution kernels obtained by splitting the filter $w^i$, $\alpha_j$ is a preset linear weighting coefficient of a $j^{th}$ fixed-point convolution kernel, $t_j$ is the $j^{th}$ fixed-point convolution kernel and the size of $t_j$ is S×S×I, B is the preset quantized number of bits, and $b_j$ is a specified bit-width corresponding to the $j^{th}$ fixed-point convolution kernel.

10. The electronic device of claim 9, wherein, before the converting the filter into the linear combination of the plurality of fixed-point convolution kernels by splitting the filter, the operations further comprise:
   determining a preset quantized number of bits based on a preset application precision of the Deep Neural Network;
   for each of the filters of the network layer, converting the filter into the linear combination of the plurality of fixed-point convolution kernels by splitting the filter comprises:
   for each of the filters of the network layer, converting the filter into the linear combination of the plurality of fixed-point convolution kernels by splitting the filter based on the preset quantized number of bits; wherein, the sum of the specified bit-widths corresponding to the fixed-point convolution kernels is equal to the preset quantized number of bits.

11. The electronic device of claim 10, wherein, calculating the weighted sum of the obtained convolution results based on the linear combination of the plurality of fixed-point convolution kernels of the filter to obtain the operation result of the filter comprises:

for each filter of the convolution layer, weighting the convolution results of the fixed-point convolution kernels based on the preset linear weighting coefficients of the fixed-point convolution kernels of the filter and calculating a sum of the weighted convolution results to obtain the operation result of the filter.

12. The electronic device of claim 10, wherein, the network layer comprises a fully connected layer, the size of the weighted tensor of the fully connected layer is M×N, and each filter of the fully connected layer is a 1×N vector, wherein M represents the number of filters included in the weighted tensor of the fully connected layer;

for each of the filters of the network layer, converting the filter into the linear combination of the plurality of fixed-point convolution kernels by splitting the filter comprises:

for each 1×N vector of the fully connected layer, converting the vector into the linear combination of the plurality of fixed-point convolution kernels by splitting the vector based on a preset splitting formula; wherein, the preset splitting formula is:

$$\begin{cases} v^x = \sum_{y=1}^{q} \beta_y t_y \\ B = \sum_{y=1}^{q} b_y \end{cases}$$

wherein, $v^x$ is an $x^{th}$ 1×N vector of the fully connected layer, $x \in [1,M]$, q is the number of the fixed-point convolution kernels obtained by splitting the vector $v^x$, $\beta_y$ is a preset linear weighting coefficient of a $y^{th}$ fixed-point convolution kernel, $t_y$ is the $y^{th}$ fixed-point convolution kernel and the size of $t_y$ is 1×N, B is the preset quantized number of bits, and $b_y$ is a specified bit-width corresponding to the $y^{th}$ fixed-point convolution kernel.

13. The method of claim 9, wherein, calculating the weighted sum of the obtained convolution results based on the linear combination of the plurality of fixed-point convolution kernels of the filter to obtain the operation result of the filter comprises:

for each filter of the convolution layer, weighting the convolution results of the fixed-point convolution kernels based on the preset linear weighting coefficients of the fixed-point convolution kernels of the filter and calculating a sum of the weighted convolution results to obtain the operation result of the filter.

14. The electronic device of claim 9, wherein, wherein, the network layer comprises a fully connected layer, the size of the weighted tensor of the fully connected layer is M×N, and each filter of the fully connected layer is a 1×N vector, wherein M represents the number of filters included in the weighted tensor of the fully connected layer;

for each of the filters of the network layer, converting the filter into the linear combination of the plurality of fixed-point convolution kernels by splitting the filter comprises:

for each 1×N vector of the fully connected layer, converting the vector into the linear combination of the plurality of fixed-point convolution kernels by splitting the vector based on a preset splitting formula; wherein, the preset splitting formula is:

$$\begin{cases} v^x = \sum_{y=1}^{q} \beta_y t_y \\ B = \sum_{y=1}^{q} b_y \end{cases}$$

wherein, $v^x$ is an $x^{th}$ 1×N vector of the fully connected layer, $x \in [1,M]$, q is the number of the fixed-point convolution kernels obtained by splitting the vector $v^x$, $\beta_y$ is a preset linear weighting coefficient of a $y^{th}$ fixed-point convolution kernel, $t_y$ is the $y^{th}$ fixed-point convolution kernel and the size of $t_y$ is 1×N, B is the preset quantized number of bits, and $b_y$ is a specified bit-width corresponding to the $y^{th}$ fixed-point convolution kernel.

15. The electronic device of claim 14, wherein, calculating the weighted sum of the obtained convolution results based on the linear combination of the plurality of fixed-point convolution kernels of the filter to obtain the operation result of the filter comprises:

for each of the 1×N vectors of the fully connected layer, weighting the convolution results of the fixed-point convolution kernels based on the preset linear weighting coefficients of the fixed-point convolution kernels of the vector and calculating a sum of the weighted convolution results to obtain the operation result of the vector.

* * * * *

UNITED STATES PATENT AND TRADEMARK OFFICE
CERTIFICATE OF CORRECTION

PATENT NO. : 12,229,668 B2
APPLICATION NO. : 17/254002
DATED : February 18, 2025
INVENTOR(S) : Yuan Zhang, Di Xie and Shiliang Pu It is certified that error appears in the above-identified patent and that said Letters Patent is hereby corrected as shown below:

On the Title Page

Item (87), please correct the PCT Pub. No. to be -- WO2020/001401 --.

In the Claims

In Claim 9, Column 18, Line 42, please delete "$i \in |1,O]$" and replace with -- $i \in [1,O]$ --.

In Claim 14, Column 20, Line 4, please delete "wherein," after -- 9, --.

Signed and Sealed this
Twenty-ninth Day of April, 2025

Coke Morgan Stewart
*Acting Director of the United States Patent and Trademark Office*